UNITED STATES PATENT OFFICE.

SAMUEL C. CLARK, OF MONTE VISTA, COLORADO.

PROCESS OF TREATING REFRACTORY ORES.

SPECIFICATION forming part of Letters Patent No. 538,951, dated May 7, 1895.

Application filed March 1, 1894. Serial No. 501,958. (No specimens.)

*To all whom it may concern:*

Be it known that I, SAMUEL C. CLARK, a citizen of the United States, residing at Monte Vista, in the county of Rio Grande and State of Colorado, have invented certain new and useful Improvements in Processes of Treating Refractory Ores; and I do declare the following to be a full, clear, and exact description of the invention, such as will enable others skilled in the art to which it appertains to make and use the same.

The general object of my invention is to provide a very cheap and simple process of treating refractory gold, silver, and copper ores, and one which may be carried out with a very cheap and simple apparatus at the place where the ore is mined so as to concentrate the metal in the ore and obviate the necessity of hauling the bulk of ore to a smelter, and which admits of the chemicals employed being readily collected after the treatment of each body of ore in order that they may be repeatedly used.

In carrying out my process and treating one ton of ore, I first finely pulverize the ore and then boil the same in from twenty to thirty gallons of water in which is placed from ten to fifteen pounds of cyanide of potassium. The boiling is continued for one hour (more or less) until the cyanide of potassium has dissolved the chloride, sulphide, bromide, or fine particles of metal in the ore, when the liquor is decanted into settling tanks, and after it has settled, I boil the clear liquid until a residue containing the metals is left, which residue may be smelted in the usual manner.

The tailings are left in the settling tanks and may be washed in water to save the chemicals which may consequently be used over and over again.

It will be seen from the foregoing that all the apparatus necessary to carry out my improved process is one or two pots and a similar number of tanks, and that therefore the process may be conveniently carried out at the place at which the ore is mined. This is advantageous because the residue obtained by boiling the clear liquid, while it contains all or substantially all the metal in the ore, is very small in weight and bulk in comparison with the mass of ore treated and may consequently be transported to the smelter at a much less cost than could the mass of ore.

It will also be noticed from the foregoing that my process is very cheap as it embodies but one chemical and that it may therefore be employed to advantage for treating the great mass of ore which yields but a small amount of metal to the ton.

Having described my invention, what I claim is—

The herein described process of treating refractory ore, consisting essentially in boiling the ore in water containing from ten to fifteen pounds of cyanide of potassium to each ton of ore for about one hour or for a sufficient length of time to enable the cyanide of potassium to dissolve the chloride, sulphide, or bromide in the ore, then allowing the solution to settle and finally evaporating the clear liquid so as to obtain a residue containing metal, substantially as set forth.

In testimony whereof I affix my signature in presence of two witnesses.

SAMUEL C. CLARK.

Witnesses:
   THOMAS JOYCE,
   H. W. GILCHRIST.